United States Patent
Noda et al.

(10) Patent No.: US 11,922,927 B2
(45) Date of Patent: Mar. 5, 2024

(54) LEARNING DATA GENERATION DEVICE, LEARNING DATA GENERATION METHOD AND NON-TRANSITORY COMPUTER READABLE RECORDING MEDIUM

(71) Applicant: NIPPON TELEGRAPH AND TELEPHONE CORPORATION, Tokyo (JP)

(72) Inventors: Yoshiaki Noda, Tokyo (JP); Setsuo Yamada, Tokyo (JP); Takaaki Hasegawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 410 days.

(21) Appl. No.: 17/268,538

(22) PCT Filed: Aug. 14, 2019

(86) PCT No.: PCT/JP2019/031936
§ 371 (c)(1),
(2) Date: Feb. 15, 2021

(87) PCT Pub. No.: WO2020/036193
PCT Pub. Date: Feb. 20, 2020

(65) Prior Publication Data
US 2021/0312908 A1    Oct. 7, 2021

(30) Foreign Application Priority Data

Aug. 15, 2018 (JP) .................................. 2018-152897

(51) Int. Cl.
*G10L 15/06* (2013.01)
*G10L 15/22* (2006.01)

(52) U.S. Cl.
CPC ............. *G10L 15/063* (2013.01); *G10L 15/22* (2013.01); *G10L 2015/0635* (2013.01); *G10L 2015/0638* (2013.01)

(58) Field of Classification Search
CPC ................... G10L 15/063; G10L 15/22; G10L 2015/0635; G10L 2015/0638
(Continued)

(56) References Cited

U.S. PATENT DOCUMENTS 10,121,471 B2 * 11/2018 Hoffmeister ............ G10L 25/93
10,269,341 B2 *  4/2019 Tadpatrikar ............. G10L 15/26
(Continued)

FOREIGN PATENT DOCUMENTS

EP           3258390 A1 * 12/2017 ........... G06F 40/247

OTHER PUBLICATIONS

Ferrer Luciana et.al "Is the Speaker Done Yet? Faster and More Accurate End-Of-Utterance Detection Using Prosody", Sep. 16-20, 2002, 7th International Conference on Spoken Language Processing [ICSLP2002], Section 1-4. (Year: 2002).*

(Continued)

*Primary Examiner* — Pierre Louis Desir
*Assistant Examiner* — Fouzia Hye Solaiman

(57) ABSTRACT

The learning data generation device (10) of the present invention comprises: an end-of-talk predict unit (11) for performing: a first prediction in which it is predicted, based on utterance information on an utterance in the dialog, using the end-of-talk prediction model (16), whether the utterance is an end-of-talk utterance of the speaker; and a second prediction in which it is predicted, based on one or more prescribed rules, whether the utterance is an end-of-talk utterance; and a training data generate unit (13) for generating, when, in the first prediction it is predicted that the utterance is not an end-of-talk utterance and in the second (Continued)

prediction it is predicted that the utterance is an end-of-talk utterance, for the utterance information on the utterance, learning data to which training data indicating that the utterance is an end-of-talk utterance is appended.

15 Claims, 5 Drawing Sheets

(58) Field of Classification Search
USPC .......................................................... 704/2
See application file for complete search history.

(56) References Cited

U.S. PATENT DOCUMENTS

| | | | |
|---|---|---|---|
| 11,056,098 B1* | 7/2021 | Gejji | G10L 25/87 |
| 11,100,384 B2* | 8/2021 | Finkelstein | G06N 5/04 |
| 2008/0004881 A1* | 1/2008 | Attwater | G10L 15/08 |
| | | | 704/E15.04 |
| 2017/0091171 A1* | 3/2017 | Perez | G06F 40/35 |
| 2018/0204571 A1* | 7/2018 | Nada | G10L 15/22 |
| 2019/0341036 A1* | 11/2019 | Zhang | G06F 40/35 |

OTHER PUBLICATIONS

Fan, Rog-En, "Liblinear: A Library for Large Linear Classification" Journal of Machine Learning Research 9 (2008) 1871-1874, Published Aug. 2008.

* cited by examiner

FIG. 2

| utterance information | TRAINING DATA |
|---|---|
| utterance information A | IS AN END-OF-TALK UTTERANCE |
| utterance information B | IS NOT AN END-OF-TALK UTTERANCE |
| utterance information C | IS NOT AN END-OF-TALK UTTERANCE |
| utterance information D | IS AN END-OF-TALK UTTERANCE |
| ⋮ | ⋮ |

LEARNING DATA GENERATION DEVICE, LEARNING DATA GENERATION METHOD AND NON-TRANSITORY COMPUTER READABLE RECORDING MEDIUM

CROSS-REFERENCE TO RELATED APPLICATIONS

This application is a U.S. 371 Application of International Patent Application No. PCT/JP2019/031936, filed on 14 Aug. 2019, which application claims priority to and the benefit of JP Application No. 2018-152897, filed on 15 Aug. 2018, the disclosures of which are hereby incorporated herein by reference in their entireties.

TECHNICAL FIELD

The present invention relates to a learning data generation device, a learning data generation method, and a program for generating learning data for learning an end-of-talk prediction model.

BACKGROUND

A dialog system which analyzes the utterance content of a speaker, and gives the speaker a response in accordance with an analysis result is being considered. According to such a dialog system, for example, in a case in which a customer phones a contact center, by having questions such as unclear points be voiced, responses to the questions can be automatically presented to the customer. In such abovementioned systems, by detecting an end-of-talk utterance of the speaker, it becomes possible to present the speaker with an appropriate response in accordance with the utterance content up to the end-of-talk of the speaker.

As a method of predicting whether an utterance in a dialog between more than one speaker is an end-of-talk utterance of a speaker, a method for creating learning data to which information regarding whether an utterance in a dialog is an end-of-talk utterance is appended, is envisioned. In this method, an end-of-talk prediction model for predicting whether the utterance in a dialog is an end-of-talk utterance is generated via machine learning that uses the learning data to which information regarding whether an utterance in the dialog is an end-of-talk utterance is appended (see, NPL 1).

CITATION LIST

Non-Patent Literature

NPL 1: R.-E. Fan, K.-W. Chang, C.-J. Hsieh, X.-R. Wang, and C.-J. Lin. "LIBLINEAR: A library for large linear classification Journal", of Machine Learning Research, 9(2008), 1871-1874.

SUMMARY

Technical Problem

For learning of the abovementioned end-of-talk prediction models, a large quantity of learning data for utterances, to which training data indicating whether it is an end-of-talk utterance is appended, is needed. In the past, it was common practice to manually perform the appending of such training data, and this led to an increase in cost.

The present invention has been conceived in view of abovementioned problems and the objective of present invention is to provide a learning data generation device, a learning data generation method, and a program for generating learning data for learning an end-of-talk prediction model, while inhibiting an increase in cost.

Solution to Problem

In order to resolve abovementioned problem, the learning data generation device of the present invention is a learning data generation device for generating learning data for learning an end-of-talk prediction model for predicting whether an utterance in a dialog between more than one speaker is an end-of-talk utterance of a speaker, the learning data generation device comprising: an end-of-talk predict unit for performing: a first prediction in which it is predicted, based on utterance information on an utterance in the dialog, using the end-of-talk prediction model, whether the utterance is an end-of-talk utterance of the speaker; and a second prediction in which it is predicted, based on one or more prescribed rules, whether the utterance is an end-of-talk utterance; and a training data generate unit for generating, when, in the first prediction it is predicted that the utterance is not an end-of-talk utterance and in the second prediction it is predicted that the utterance is an end-of-talk utterance, for the utterance information on the utterance, learning data to which training data indicating that the utterance is an end-of-talk utterance is appended.

Further, to solve the abovementioned problems, the learning data generation device of the present invention is a learning data generation device for generating learning data for learning an end-of-talk prediction model for predicting whether an utterance in a dialog between more than one speaker is an end-of-talk utterance of a speaker, the learning data generation device comprising: an end-of-talk predict unit for predicting whether the utterance of the dialog is an end-of-talk utterance of the speaker; an interruption utterance detection unit for detecting, after a first utterance predicted by the end-of-talk predict unit to be an end-of-talk utterance, occurrence of an interruption utterance that is an utterance by the speaker of the first utterance and is an utterance emitted during a second utterance by a speaker other than that of the speaker of the first utterance; and a training data generate unit for generating, when the interruption utterance detection unit detects within a prescribed time from the start of the second utterance, an interruption utterance, for the utterance information on the first utterance, learning data to which training data indicating that the first utterance is not an end-of-talk utterance is appended.

Further, in order to resolve abovementioned problem, the learning data generation method of the present invention is a learning data generation method regarding a learning data generation device for generating learning data for learning an end-of-talk prediction model for predicting whether an utterance in a dialog between more than one speaker is an end-of-talk utterance of a speaker, the method comprising: performing: a first prediction in which it is predicted, based on utterance information on an utterance in the dialog, using the end-of-talk prediction model, whether the utterance is an end-of-talk utterance of the speaker; and a second prediction in which it is predicted, based on one or more prescribed rules, whether the utterance is an end-of-talk utterance; and generating, when, in the first prediction it is predicted that the utterance is not an end-of-talk utterance and in the second prediction it is predicted that the utterance is an end-of-talk utterance, for the utterance information on the utterance, learning data to which training data indicating that the utterance is an end-of-talk utterance is appended.

Further, to solve the abovementioned problems, the learning data generation method of the present invention is a learning data generation method regarding a learning data generation device for generating learning data for learning an end-of-talk prediction model for predicting whether an utterance in a dialog between more than one speaker is an end-of-talk utterance of a speaker, the method comprising: predicting whether the utterance of the dialog is an end-of-talk utterance of the speaker; detecting, after a first utterance predicted to be an end-of-talk utterance, occurrence of an interruption utterance that is an utterance by the speaker of the first utterance and is an utterance emitted during a second utterance by a speaker other than the speaker of the first utterance; and generating, when, within a prescribed time from the start of the second utterance an interruption utterance is detected, for the utterance information on the first utterance, learning data to which training data indicating that the first utterance is not an end-of-talk utterance is appended.

Further, to solve abovementioned problems, the program pertaining to present invention causes a computer to function as the abovementioned learning data generation device.

Advantageous Effect

According to the learning data generation device, learning data generation method, and program of the present invention, it is possible to generate learning data for learning an end-of-talk prediction model, while inhibiting an increase in cost.

BRIEF DESCRIPTION OF THE DRAWINGS

In the accompanying drawings:

FIG. 2 is a diagram showing an example of a configuration of end-of-talk learning data stored by an end-of-talk learning data store shown in FIG. 1;

DETAILED DESCRIPTION

Figure 1:
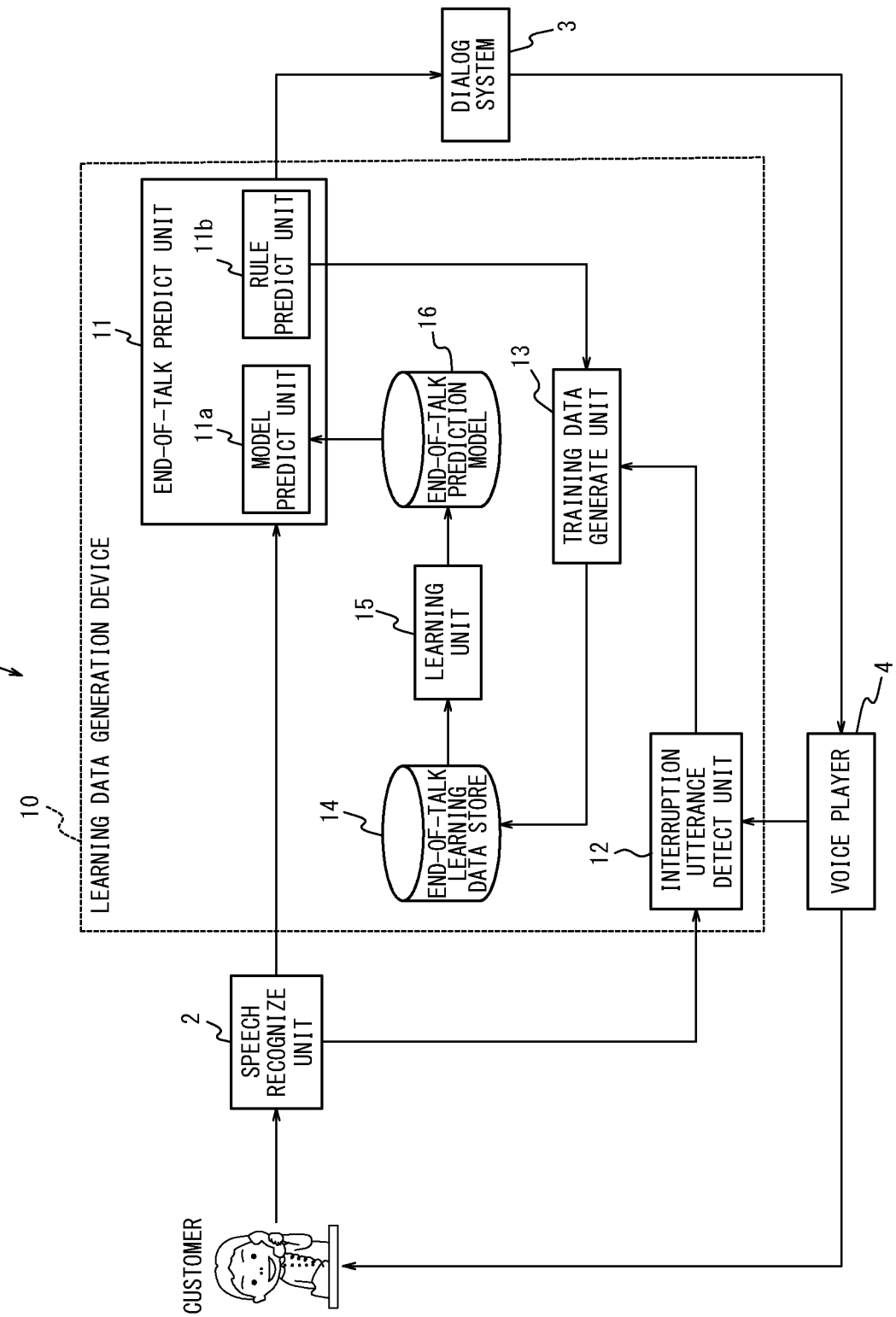
FIG. 1 is a schematic diagram illustrating an example of a configuration of an automatic voice response system including a learning data generation device according to an embodiment of the present invention.

Hereinafter, embodiments of the present invention will be described with reference to the drawings. In each of the diagrams, the same reference numerals indicate the same or equivalent constituent elements.

FIG. 1 is a schematic diagram illustrating an example of a configuration of an automatic voice response system including a learning data generation device according to an embodiment of the present invention. The automatic voice response system 1 is a system that, in a contact center or the like, analyzes the utterance content of customers and emits a voice (system utterance voice) in accordance with the analysis result. For the automatic voice response system 1 to give an appropriate response in accordance with the utterance content of the customer, it is important to predict whether the utterance of the speaker (customer) is an end-of-talk utterance in which the speaker has finished speaking the content that the speaker wanted to convey. A prediction like this may be performed using an end-of-talk prediction model for predicting whether the utterance of the speaker is an end-of-talk utterance. The learning data generation device 10 pertaining to the present embodiment generates learning data for the learning of the abovementioned end-of-talk prediction model.

The automatic voice response system 1 comprises a speech recognize unit 2, a dialog system 3, a voice player 4, an end-of-talk predict unit 11, an interruption utterance detection unit 12, a training data generate unit 13, an end-of-talk learning data store 14, and a learning unit 15. The end-of-talk predict unit 11, the interruption utterance detection unit 12 the training data generate unit 13, the end-of-talk learning data store 14, and the learning unit 15 constitute the learning data generation device 10.

The utterance voice of the customer is inputted into the speech recognize unit 2. The speech recognize unit 2 converts the inputted utterance voice of the customer, by speech recognition, into utterance information such as text information, and outputs this to the end-of-talk prediction unit 11. Further, the speech recognize unit 2 outputs, to the end-of-talk prediction unit 11, an utterance start time at which the utterance by the customer was started and an utterance finish time at which the utterance finished. Further, when the utterance of the customer is detected, the speech recognize unit 2 outputs, to the interruption utterance detection unit 12, an utterance detection signal indicative of detection of the utterance of the customer and an utterance start time at which the utterance was started. Further, the speech recognize unit 2 may output to the interruption utterance detection unit 12 an utterance continuation time for which the utterance was continued.

The end-of-talk predict unit 11 predicts whether the utterance indicated in the utterance information outputted from the speech recognize unit 2 is an end-of-talk utterance of the speaker (customer). When the end-of-talk predict unit 11 predicts that the utterance indicated by the utterance information is not an end-of-talk utterance, that utterance information is accumulated. Then, when the end-of-talk predict unit 11 predicts that the utterance indicated by the utterance information outputted from speech recognize unit 2 is an end-of-talk utterance, that utterance information and the utterance information accumulated up to that point are outputted, in the utterance order, to the dialog system 3. Moreover, the details of the end-of-talk predict unit 11 will be given later.

The dialog system 3 generates, based on utterance information outputted from the end-of-talk predict unit 11, response text in accordance with the utterance content of the customer, and system utterance information for voice synthesis parameters for the system utterance voice such as a voice quality of the system utterance voice and speech rapidity of the system utterance voice, and this is outputted to voice player 4. Because utterance information of utterances up to the utterance predicted to be the end-of-talk utterance is accumulated and outputted from the end-of-talk predict unit 11, the dialog system 3, based on this information, does not respond solely with incomplete information that has been delimited part-way through the speech of the customer, but can respond based on all of the utterance content after the customer has finished speaking.

The voice player 4, based on the system utterance information outputted from the dialog system 3, synthesizes the system utterance voice and plays this such that it can be heard by the customer. Further, in a case in which voice player 4 is to output the system utterance voice, a system utterance start time at which output of the system utterance voice was started is outputted to the interruption utterance detection unit 12. Further, while continuing output of the system utterance voice, the voice player 4 outputs, to the interruption utterance detection unit 12, a system utterance continuation signal indicating that the system utterance voice is being outputted.

The speech recognize unit 2 outputs, as a single unit, a speech recognition result for the voice interval spanning from the detection of a start point of the voice up to the detection of an end point of the voice. Here, in a case in which, after a point in time at which it has been predicted that voice is not being spoken this continues for a certain length of time (e.g. approximately 0.5 to 3 seconds) (i.e., when a silent interval continues for a certain length of time), it is common for the point in time at which it was predicted that voice is not being spoken to be detected as the end point of the voice. Thus, the speech recognize unit 2 outputs, when a prescribed silent interval is detected whilst a person is speaking, the speech recognition result of the utterances up to that point. Thus, with regard to the abovementioned automatic voice response system 1, the speech recognition result of the utterances up to that point is outputted at a timing involving an intermission, even if the speaker (customer) is in the midst of speaking, and a response to the customer is performed for the speech recognition result unit. Thus, for example, in a case in which the customer emits utterances intermittently, a proper response cannot be provided to the customer. Further, in order to deal with intermittent utterances, setting of a longer silent interval for the detection of the end point of the voice may be considered. However, if a longer silent interval is set for the detection of the end point of the voice (e.g. 3 seconds), the customer would be made to wait a time corresponding to the silent interval before receiving a response to the utterance, and the response of the automatic voice response system 1 would be degraded. Thus, appropriate detection of the end-of-talk utterance of the customer is important for providing an appropriate response to the utterance content of the customer. In the present embodiment, by detecting the end-of-talk utterance of the customer using the end-of-talk predict unit 11 provided in between the speech recognize unit 2 and the dialog system 3, responses and the like from the automatic voice response system 1 during the speech of the customer and incorrect responses based on utterances preceding the completion of the speech of the customer regarding the matter to be conveyed may be suppressed.

The end-of-talk predict unit 11 comprises a model predict unit 11*a* and a rule predict unit 11*b*.

The model predict unit 11*a* performs, using the end-of-talk prediction model 16, prediction of whether an utterance indicated in the utterance information outputted from speech recognize unit 2 is an end-of-talk utterance of the speaker (first prediction). The end-of-talk prediction model 16, for example, based on the utterance content indicated in the utterance information, performs the prediction of whether the utterance is an end-of-talk utterance. Further, the end-of-talk prediction model 16 may perform, based on the tail pattern (word ending) of the utterance indicated in the utterance information, prediction of whether the utterance is an end-of-talk utterance.

The rule predict unit 11*b* performs, based on one or more prescribed rules, prediction of whether the utterance indicated in the utterance information is an end-of-talk utterance of the speaker (second prediction). The rule predict unit 11*b*, for example, based on a rule according to which the utterance is predicted to be an end-of-talk utterance in a case in which there is no utterance from the customer for a prescribed time longer (time out) after the utterance of the customer indicated in the utterance information, performs the prediction of whether the utterance indicated in the utterance information is an end-of-talk utterance of the speaker (second prediction).

In a case in which, for a prescribed time or longer, there is no next utterance after the utterance of the speaker (customer), it can be considered that speaker (customer) has finished speaking and is awaiting a response from the other speaker (automatic voice response system 1). Thus, the rule predict unit 11*b* predicts, in a case in which there is no next utterance after the utterance of the customer for a prescribed time or longer, that that utterance is an end-of-talk utterance.

In a case in which it is predicted by the model predict unit 11*a* that the utterance indicated in the utterance information is a speech prediction utterance of the speaker, the end-of-talk predict unit 11 predicts that the utterances indicated in the utterance information is the end-of-talk utterance of the speaker, and outputs that utterance information and the utterance information accumulated until then to the dialog system 3, in the utterance order.

On the other hand, in a case in which it is predicted by the model predict unit 11*a* that the utterance indicated in the utterance information is not an end-of-talk utterance of the speaker, the end-of-talk predict unit 11 causes the rule predict unit 11*b* to perform a prediction. In a case in which it is predicted by the model predict unit 11*a* that the utterance indicated in the utterance information is not an end-of-talk utterance of the speaker, i.e. a case in which it is predicted that the speech of the customer is still being continued, a case arises in which, though the customer has finished speaking, the automatic voice response system 1 continues to wait for a subsequent utterance of the customer. In this case, though the customer has finished speaking, the automatic voice response system 1 does not make a response. Thus, in a case in which it is predicted that, by the model predict unit 11*a*, the utterance indicated in the utterance information is not an end-of-talk utterance of the speaker, the occurrence of the abovementioned case may be prevented by making the rule predict unit 11*b* perform the prediction.

As the time to be used for predicting the time out, for example, a long time such as 5 seconds could be set. Further, at speech recognize unit 2, the silent interval for detecting the end point of the utterance could be set at a short time such as 0.5 seconds. By setting the silent interval for the detection of the end point of the utterance to a short time, speech recognition results can be obtained in shorter cycles, and as a result, a swift response to the end-of-talk of the customer becomes possible.

The end-of-talk model 16 can be generated by performing learning on the end-of-talk learning data stored by the end-of-talk learning data store 14. The end-of-talk learning data is data, appended to which is training data indicating, for various utterances, either that it is an end-of-talk utterance (positive sample) or that it is not an end-of-talk utterance (negative sample).

FIG. 2 is a diagram showing an example of a configuration of end-of-talk learning data stored by the end-of-talk learning data store 14 shown in FIG. 1.

As shown in FIG. 2, the end-of-talk learning data is data, appended to which is training data indicating, for the utterance information, either that the utterance indicated in the utterance information is an end-of-talk utterance or that the utterance indicated in the utterance information is not an end-of-talk utterance. Moreover, besides the text of the utterances obtained by speech recognition, information on candidates #1 to #N from among speech recognition result candidates, information on a word series included in the utterance, information on a part of speech of the words included in the utterance, information on a score indicating the plausibility of the candidates of the speech recognition result, and the like, may be used as the utterance information. Further, voice information on the utterances may also be used as utterance information.

For the learning of the end-of-talk prediction model 16, a large amount of end-of-talk learning data such as that shown in FIG. 2 needs to be prepared. Here, as mentioned above, in the past, because training data was appended manually, this entailed an increase in cost.

Again referring to FIG. 1, in a case in which it is predicted by the model predict unit 11a that the utterance indicated in the utterance information is not an end-of-talk utterance, the rule predict unit 11b predicts, when a time out occurs, that that utterance is an end-of-talk utterance. Then, the rule predict unit 11b outputs to the training data generate unit 13 information that indicates that the utterance predicted by the model predict unit 11a not to be an end-of-talk utterance is an end-of-talk utterance.

The interruption utterance detection unit 12 detects the occurrence of an interruption utterance that is, an utterance of a customer (first speaker) that is emitted after the utterance predicted to be an end-of-talk utterance by the end-of-talk predict unit 11 (first utterance) and emitted during an utterance (second utterance) by a speaker other than the speaker (customer) of that utterance. In the automatic voice response system 1 shown in FIG. 1, the second utterance is an utterance by the automatic voice response system 1 (system utterance). Moreover, the interruption utterance detection unit 12 may, based on an utterance detection signal and utterance start time outputted from the speech recognize unit 2, a system utterance continuation signal and a system utterance start time outputted from the voice player 4, and the like, detect the occurrence of the interruption utterance.

Irrespective of the end-of-talk predict unit 11 having predicted that the utterance indicated in the utterance information is an end-of-talk utterance, in a case in which, after the start of an utterance of the automatic voice response system 1 in response to that utterance and within a prescribed time, an interruption utterance by the customer is detected, it may be predicted that the customer had not finished speaking. Thus, in a case in which, after the utterance (second utterance) of the automatic voice response system 1 in response to the utterance (first utterance) predicted to be an end-of-talk utterance and within a prescribed time, an interruption utterance is detected, the interruption utterance detection unit 12 outputs to the training data generate unit 13 information indicating that the utterance (first utterance) predicted by the end-of-talk predict unit 11 to be an end-of-talk utterance is not an end-of-talk utterance.

Moreover, in a case in which the continuation time of the utterance of the customer is shorter than or equal to a prescribed threshold time, and/or, in a case in which a character count of the utterance of the customer is less than or equal to a prescribed threshold character count, that utterance is not detected as an interruption utterance. By doing so, the interruption utterance detection unit 12 can exclude the likes of noise and coughs from interruption utterances. The interruption utterance detection unit 12 can, based on the utterance continuation time outputted from the speech recognize unit 2, predict whether the continuation time of the utterance of the customer is shorter than or equal to the prescribed threshold time. Further, the interruption utterance detection unit 12 can, based on the utterance information, predict whether the character count of the utterance of the customer is less than or equal to the prescribed threshold character count.

The training data generate unit 13 generates, based on the output of the rule predict unit 11b, for the utterance information, end-of-talk learning data, appended to which is training data indicating whether the utterance indicated in that utterance information is an end-of-talk utterance. Specifically, based on the information, outputted from the rule predict unit 11b, indicating that the utterance predicted by model predict unit 11a to not be an end-of-talk utterance is indeed an end-of-talk utterance, for the utterance information of the utterance, the training data generate unit 13 generates an end-of-talk learning data to which training data indicating that that utterance is an end-of-talk utterance is appended.

That is, when it is predicted by the prediction (first prediction) of the model predict unit 11a that the utterance indicated in the utterance information is not an end-of-talk utterance, and when it is predicted by the prediction (second prediction) of the rule predict unit 11b that that utterance is an end-of-talk utterance, the training data generate unit 13 generates, with regard to the utterance information of the utterance, learning data to which training data indicating that that utterance is an end-of-talk utterance is appended.

Further, the training data generate unit 13 generates, based on the output of the interruption utterance detection unit 12, for the utterance information, end-of-talk learning data appended to which is training data indicating whether the utterance indicated in that utterance information is an end-of-talk utterance. Specifically, based on the information, outputted from the interruption utterance detection unit 12, indicating that the utterance predicted by end-of-talk predict unit 11 to be an end-of-talk utterance (first utterance) is indeed not an end-of-talk utterance, for the utterance information of that utterance, the training data generate unit 13 generates end-of-talk learning data to which training data indicating that that utterance is not an end-of-talk utterance is appended.

That is, when an interruption utterance is detected by the interruption utterance detection unit 12 after the utterance (first utterance) predicted by end-of-talk predict unit 11 to be an end-of-talk utterance, and within a prescribed time from the start of the utterance (second utterance) by the automatic voice response system 1, training data generate unit 13 generates, with regard to the utterance information of the utterance (first utterance) predicted to be an end-of-talk utterance, end-of-talk learning data to which training data indicating that that utterance is not an end-of-talk utterance is appended.

The training data generate unit 13 automatically generates, based on the outputs of the model predict unit 11a and the interruption utterance detection unit 12, end-of-talk utterance learning data. Thus, end-of-talk utterance learning data can be generated while inhibiting an increase in cost and without relying on human labor. The training data generate unit 13 causes the end-of-talk utterance learning data store 14 store the generated end-of-talk utterance learning data.

The learning unit 15, by learning of the learning data generated by the training data generate unit 13 and stored by the learning data store 14, updates the end-of-talk prediction model 16. Further, in an initial state and the like, in which the end-of-talk prediction model 16 is not yet generated, the learning unit 15 may generate the end-of-talk prediction model 16 using learning of the learning data generated by the training data generate unit 13. In the initial state in which the end-of-talk prediction model 16 has not been generated, because the model predict unit 11*a* cannot perform the prediction, the training data generate unit 13 generates learning data from, for example, the result from the prediction (prediction by way of occurrence of a time out) by the rule predict unit 11*b*.

Hereinafter, learning data generation by the learning data generation device 10 will be explained.

First, generation of the learning data depending on the occurrence of a time out will be explained with reference to FIG. 3.

Figure 3:
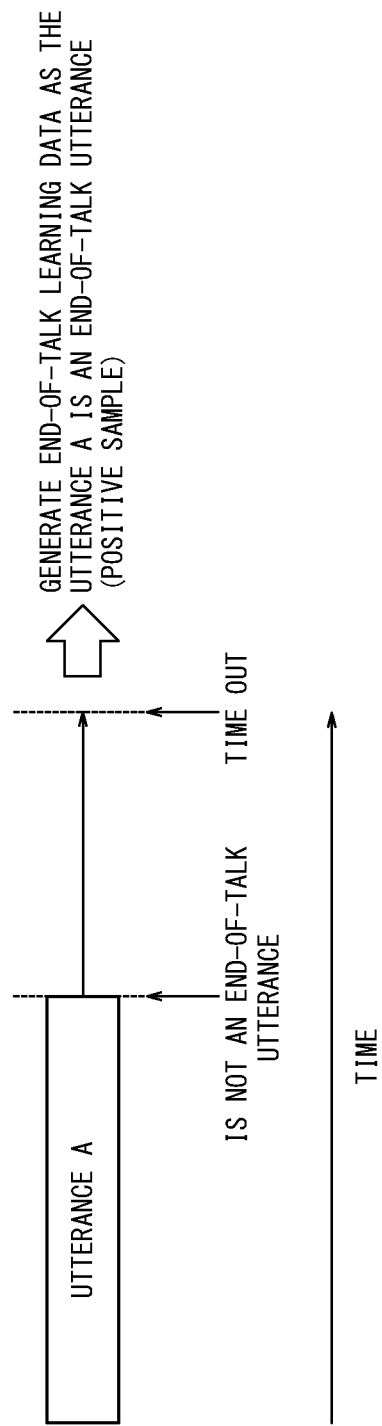
FIG. 3 is diagram for explaining generation of learning data by the learning data generation device of FIG. 1 depending on the occurrence of a time out.

In FIG. 3, it is assumed that the model predict unit 11*a* has predicted that an utterance A is not an end-of-talk utterance. In a case in which after the termination of the utterance A there an utterance of the speaker (customer) was not detected for a prescribed time or longer (a case in which a time out occurred), the rule predict unit 11*b* predicts that the utterance A is an end-of-talk utterance, and outputs to the training data generate unit 13 information that indicates that the utterance A is an end-of-talk utterance. The training data generate unit 13 generates, based on the output of the rule predict unit 11*b*, with regard to the utterance information of the utterance A, learning data to which training data indicating that the utterance A is an end-of-talk utterance is appended (positive sample).

Generation of the learning data depending on the occurrence of an interruption utterance will be explained with reference to FIGS. 4A and 4B.

Figure 4A:
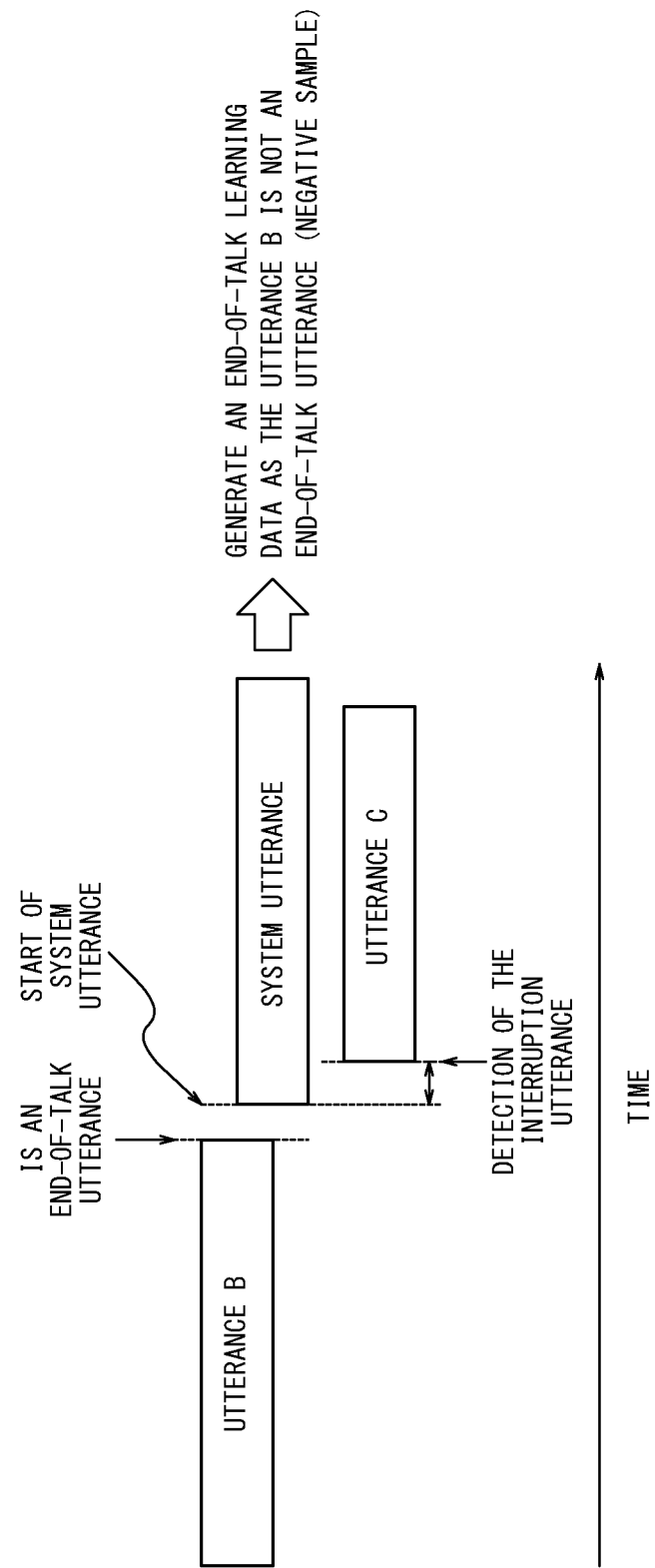
FIG. 4A is diagram for explaining generation of learning data by the learning data generation device of FIG. 1 depending on the occurrence of an interruption utterance.

In FIG. 4A, it is assumed that the end-of-talk predict unit 11 has predicted that an utterance B is an end-of-talk utterance. In a case in which the utterance B is predicted to be an end-of-talk utterance, a system utterance in accordance with the utterance content of the utterances up to the utterance B is performed after the previous end-of-talk utterance by the automatic voice response system 1. Here, in a case in which after the start of the system utterance and within a prescribed time an utterance C of the customer (interruption utterance) is detected, the interruption utterance detection unit 12 outputs to the training data generate unit 13 information indicating that the utterance B is not an end-of-talk utterance. The training data generate unit 13 generates, based on the output of the interruption utterance detection unit 12, with regard to the utterance B, learning data to which training data indicating that the utterance B is not an end-of-talk utterance is appended (negative sample).

Figure 4B:
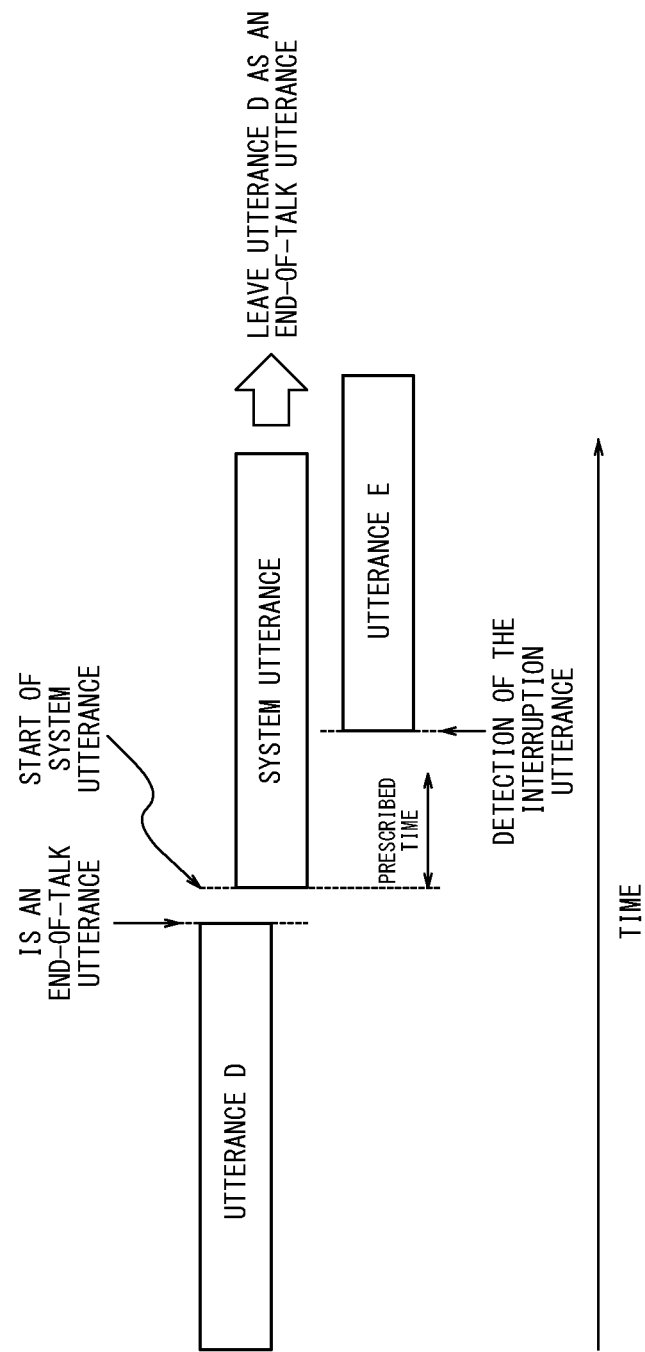
FIG. 4B is diagram for explaining generation of learning data by the learning data generation device of FIG. 1 depending on the occurrence of an interruption utterance.

Next, in FIG. 4B, it is assumed that the end-of-talk predict unit 11 has predicted that an utterance D is an end-of-talk utterance. In a case in which the utterance D is predicted to be an end-of-talk utterance, a system utterance in accordance with the utterance content of the utterances up to the utterance D is performed after the previous end-of-talk utterance by the automatic voice response system 1. Here, it is assumed that an utterance E of the customer was detected, after the start of the system utterance and after elapse of a prescribed time or longer (collision of the system utterance and the utterance E). In this case, the utterance E of the customer is considered to be an utterance predicated on having heard the system utterance. In this case, the training data generate unit 13 predicts that the prediction of the end-of-talk predict unit 11 that the utterance D is an end-of-talk utterance is true, and the utterance D is left as an end-of-talk utterance.

Moreover, the training data generate unit 13 may, with regard to the utterance information of the utterance D, generate learning data to which training data indicating that the utterance D is an end-of-talk utterance is appended (positive sample). That is, the training data generate unit 13 may generate, in a case in which an utterance (utterance E) of the speaker (customer) of the utterance D (first utterance) is detected after a prescribed time has elapsed from the start of the system utterance (second utterance), for the utterance information on the utterance D, learning data to which training data indicating that the utterance D is an end-of-talk utterance is appended.

Further, though in the present embodiment explanation has been provided with respect to a dialog between the customer and the automatic voice response system 1, this is not limiting and the learning data generation device 10 may also generate learning data from a human-to-human dialog using similar methods (occurrence of time outs and occurrence of interruption utterances).

For human-to-human utterances, the rule predict unit 11*b* may perform a prediction as to whether the utterance indicated in the utterance information is an end-of-talk utterance, based on a rule that predicts for a case in which the speaker has switched subsequent to an utterance that that utterance is an end-of-talk utterance.

In general, in a dialog between a customer and a service person at a contact center, for example, dialog structures in which, after the customer finishes voicing the inquiry content, the service person voices an answer in response to that inquiry, and after the service person finishes voicing the answer, the customer makes further queries, is common. That is, when speaker turn taking happens, the utterance immediately prior to the speaker turn tends to be an end-of-talk utterance of the speaker prior to the speaker turn. Thus, in a case in which a speaker turn taking has happened subsequent to an utterance, it can be predicted that there is a high probability that that utterance is an end-of-talk utterance. The rule predict unit 11*b* can, leveraging this type of tendency, predict whether the utterance indicated in the utterance information is an end-of-talk utterance.

As discussed, the present embodiment comprises: an end-of-talk predict unit 11 for performing: a first prediction in which it is predicted, based on utterance information on an utterance in the dialog, using the end-of-talk prediction model 16, whether the utterance is an end-of-talk utterance of the speaker; and a second prediction in which it is predicted, based on one or more prescribed rules, whether the utterance is an end-of-talk utterance; and a training data generate unit 13 for generating, when, in the first prediction it is predicted that the utterance is not an end-of-talk utterance and in the second prediction it is predicted that the utterance is an end-of-talk utterance, for the utterance information on that utterance, learning data to which training data indicating that that utterance is an end-of-talk utterance is appended.

As discussed, in a case in which the utterance predicted by the end-of-talk prediction model 16 to not be an end-of-talk utterance is, based on one or more prescribed rules, predicted to be an end-of-talk utterance, with regard to the utterance information of that utterance, learning data is generated to which training indicating that that utterance is an end-of-talk utterance is appended. Thus, because learning data with training data appended thereto is automatically generated, it is possible to generate learning data for the learning of the end-of-talk prediction model 16, while inhibiting an increase in cost.

Further, the present embodiment comprises: an end-of-talk predict unit 11 for predicting whether the utterance of the dialog is an end-of-talk utterance of the speaker; an interruption utterance detection unit 12 for detecting, after a first utterance predicted by the end-of-talk predict unit 11 to be an end-of-talk utterance, occurrence of an interruption utterance that is an utterance by the speaker of the first utterance and is an utterance emitted during a second utterance by a speaker other than that of the speaker of the first utterance; and a training data generate unit 13 for generating, when the interruption utterance detection unit 12 detects within a prescribed time from the start of the second utterance an interruption utterance, for the utterance information on the first utterance, learning data to which training data indicating that the first utterance is not an end-of-talk utterance is appended.

As discussed, in a case in which an interruption utterance is detected, after the first utterance predicted by the end-of-talk predict unit 11 to be an end-of-talk utterance and within a prescribed time from the start of the second utterance, with regard to the utterance information of the first utterance, learning data is generated to which training data indicating that that first utterance is not an end-of-talk utterance is appended. Thus, because learning data with training data appended thereto is automatically generated, it is possible to generate learning data for the learning of the end-of-talk prediction model 16, while inhibiting an increase in cost.

The learning data generation device 10 has been explained above but it should be noted that, in order to function as the learning data generation device 10, a computer may also be used. Such a computer may be realized by causing the CPU of the computer to read out and execute a program that defines procedures for realizing the respective functions of the learning data generation device 10 and is stored on a memory of the computer.

Further, the program may be recorded on a computer readable recording medium. By using such a recording medium, the program can be installed on a computer. Here, the recording medium on which the program is recorded may be a non-transitory recording medium. Though the non-transitory recording medium is not particularly limited, it may, for example, be a recording medium such as a CD-ROM and/or a DVD-ROM etc.

Although the above embodiments have been described as typical examples, it will be evident to skilled person that many modifications and substitutions are possible within the spirit and scope of the present invention. Therefore, the present invention should not be construed as being limited by the above embodiments, and various changes and modifications and the like can be made without departing from the claims. For example, it is possible to combine a plurality of constituent blocks described in the configuration diagram of the embodiment into one, or to divide one constituent block.

REFERENCE SIGNS LIST

1 automatic voice response system
2 speech recognize unit
3 dialog system
4 voice player
10 learning data generation device
11 end-of-talk predict unit
11*a* model predict unit
11*b* rule predict unit
12 interruption utterance detection unit
13 training data generate unit
14 end-of-talk learning data store
15 learning unit
16 end-of-talk prediction model

The invention claimed is:

1. A learning data generation device for generating learning data for learning a machine learning model, the learning data generation device comprising:
a computer configured to:
acquire utterance information on an utterance in a dialog;
automatically perform a first prediction in which it is predicted, based on the utterance information, using an end-of-talk prediction model, whether the utterance is an end-of-talk utterance of the speaker; and a second prediction in which it is predicted, based on one or more prescribed rules, whether the utterance is an end-of-talk utterance, wherein the one or more prescribed rules are rules regarding a silent interval;
automatically generate, when, in the first prediction it is predicted that the utterance is not an end-of-talk utterance and in the second prediction it is predicted that the utterance is an end-of-talk utterance, for the utterance information on the utterance, learning data for machine learning of the end-of-talk prediction model to which training data indicating that the utterance is an end-of-talk utterance is appended, wherein the learning data is used to improve the prediction error of the end-of-talk model based on the prediction result of the second prediction.

2. The learning data generation device according to claim 1,
wherein the computer performs the second prediction based on a rule according to which the utterance is predicted to be an end-of-talk utterance in a case in which there is no utterance from the speaker for a prescribed time or more after the utterance.

3. The learning data generation device according to claim 1,
wherein the computer performs the second prediction based on a rule according to which the utterance is predicted to be an end-of-talk utterance in a case in which speaker turn taking happens after the utterance.

4. A learning data generation device for generating learning data for learning an end-of talk prediction model, the learning data generation device comprising:
a computer configured to:
acquire utterance information on a first utterance in a dialog;
predict whether the first utterance of the dialog is an end-of-talk utterance of the speaker using a machine learning model;
detect, after acquiring the first utterance, occurrence of an interruption utterance, wherein the interruption utterance is uttered by a first speaker of the first utterance, and the interruption utterance is emitted during a second utterance by a second speaker other than the first speaker of the first utterance;
automatically generate, when detecting the occurrence of the interruption utterance within a prescribed time from the start of the second utterance, learning data for machine learning to which training data indicating that the first utterance is not an end-of-talk utterance is appended, wherein the end-of-talk prediction model, based on the learning data, recognizes an end of the utterance when the first prediction of the utterance indicates not an end-of-talk utterance and the second prediction of the utterance indicates an end-of-talk utterance.

5. The learning data generation device according to claim 4,
wherein the computer generates, when an utterance of the speaker of the first utterance is detected after a prescribed time has elapsed from the start of the second utterance, for the utterance information on the first utterance, learning data to which training data indicating that the first utterance is an end-of-talk utterance is appended.

6. The learning data generation device according to claim 4,
wherein the second utterance is an utterance by a dialog system that emits an utterance in accordance with the utterance content of the speaker of the first utterance.

7. The learning data generation device according to claim 1, the computer updates the end-of-talk prediction model by performing learning on the generated learning data.

8. A learning data generation method generating learning data for learning an end-of-talk prediction model, the method comprising:
acquiring utterance information on an utterance in a dialog;
automatically performing:
a first prediction in which it is predicted, based on the utterance information, using the end-of-talk prediction model, whether the utterance is an end-of-talk utterance of the speaker, and
a second prediction in which it is predicted, based on one or more prescribed rules, whether the utterance is an end-of-talk utterance, wherein the one or more prescribed rules are rules regarding a silent interval;
automatically generating, when, in the first prediction it is predicted that the utterance is not an end-of-talk utterance and in the second prediction it is predicted that the utterance is an end-of-talk utterance, for the utterance information on the utterance, learning data for machine learning of the end-of-talk prediction model to which training data indicating that the utterance is an end-of-talk utterance is appended, wherein the learning data is used to improve the prediction error of the end-of-talk model based on the prediction result of the second prediction.

9. A non-transitory computer readable recording medium recording a program for causing a computer to function as a learning data generation device according to claim 1.

10. The learning data generation device according to claim 5,
wherein the second utterance is an utterance by a dialog system that emits an utterance in accordance with the utterance content of the speaker of the first utterance.

11. The learning data generation device according to claim 2, wherein
the computer updates the end-of-talk determination model by performing learning on the generated learning data.

12. The learning data generation device according to claim 3, wherein
the computer updates the end-of-talk determination model by performing learning on the generated learning data.

13. The learning data generation device according to claim 4, wherein
the computer updates the end-of-talk determination model by performing learning on the generated learning data.

14. The learning data generation device according to claim 5, wherein
the computer updates the end-of-talk determination model by performing learning on the generated learning data.

15. The learning data generation device according to claim 6, wherein
the computer updates the end-of-talk determination model by performing learning on the generated learning data.

* * * * *